US008165809B1

(12) United States Patent
Baker et al.

(10) Patent No.: US 8,165,809 B1
(45) Date of Patent: Apr. 24, 2012

(54) SYSTEM AND METHOD FOR OPTIMIZED FLIGHT PLANNING

(75) Inventors: Daniel Baker, Houston, TX (US); Karl Lehenbauer, Houston, TX (US); David Cameron McNett, Austin, TX (US); Mark L. Duell, Jr., Houston, TX (US)

(73) Assignee: FlightAware, LLC, Houston, TX (US)

( * ) Notice: Subject to any disclaimer, the term of this patent is extended or adjusted under 35 U.S.C. 154(b) by 0 days.

(21) Appl. No.: 13/314,551

(22) Filed: Dec. 8, 2011

Related U.S. Application Data

(62) Division of application No. 12/358,933, filed on Jan. 23, 2009.

(51) Int. Cl.
*G01C 21/00* (2006.01)

(52) U.S. Cl. .................. 701/533; 705/14.66; 705/40

(58) Field of Classification Search .................. 701/533, 701/400, 3, 14; 705/400, 414, 417
See application file for complete search history.

(56) References Cited

U.S. PATENT DOCUMENTS

| | | | |
|---|---|---|---|
| 5,526,265 A | 6/1996 | Nakhla | |
| 6,134,500 A | 10/2000 | Tang et al. | |
| 6,199,008 B1 | 3/2001 | Aratow et al. | |
| 6,859,694 B2 | 2/2005 | Andrews et al. | |
| 7,546,206 B1 | 6/2009 | Miller et al. | |
| 2004/0148179 A1 | 7/2004 | Kumhyr et al. | |
| 2005/0187677 A1 | 8/2005 | Walker | |
| 2006/0031006 A1 | 2/2006 | Stenbock et al. | |
| 2008/0046280 A1 | 2/2008 | Horstemeyer | |

OTHER PUBLICATIONS

FlightAware Frequently Asked Questions, www.flightaware.com Feb. 19, 2006.
www.aeroplanner.com, Flight planning site. Printed Oct. 20, 2008.
www.airnav.com/plan/fuel, Fuel Stop Planner site. Printed Nov. 3, 2008.
www.fltplan.com, Flight Planning site. Printed Oct. 20, 2008.
www.rmstek.com/fs_bargain.php, Bargain fuel locator. Printed Oct. 20, 2008.

*Primary Examiner* — Yonel Beaulieu
(74) *Attorney, Agent, or Firm* — Woodard, Emhardt, Moriarty, McNett & Henry LLP

(57) ABSTRACT

A computer-implemented system and method for the processing and optimization of flight plans is disclosed. Information regarding a plurality of previous flight plans is received over a digital network and is stored in at least a database. The database preferably includes aviation fuel price information, aircraft performance information, and aviation weather information as well. Upon receiving a request, a server generates at least an optimized portion of a flight plan. In one form, historical flight plan data of others is automatically used to aid in the determination of the optimized route offered to the user for review, with the resulting final flight plan being electronically filed with the FAA upon approval. In a further form, the user may arrange fuel transactions at intermediate destinations with the service provider receiving a fee in exchange for facilitating the transaction.

3 Claims, 6 Drawing Sheets

SYSTEM AND METHOD FOR OPTIMIZED FLIGHT PLANNING

CROSS-REFERENCE TO RELATED APPLICATIONS

This application is a divisional of U.S. application Ser. No. 12/358,933, filed Jan. 23, 2009, which is hereby incorporated by reference in its entirety.

FIELD OF THE INVENTION

The present invention generally relates to a system and method for electronically processing flight plans. More particularly, the present invention pertains to a web-based flight planning service which provides various flight planning and refueling optimizations.

BACKGROUND

A flight plan is a document filed by a pilot, dispatcher, or a controller with the Federal Aviation Administration (FAA), or another civil aviation authority, prior to departure. A flight plan generally includes the basic information one would expect, such as departure date, time, and an origin and destination airport. In addition to these necessary details, a flight plan also includes the aircraft identification and aircraft type, an estimated time en route, a listing of alternate airports for use in the event of bad weather, the type of flight (either instrument flight rules (IFR) or visual flight rules (VFR)), pilot's name, and number of people on board. In the United States, flight plans are required for flights under IFR so that air traffic control may initiate tracking and routing services. Under VFR, a flight plan is optional unless the flight's path will cross national borders. Despite this, flight plans are highly recommended in many VFR flights as they provide a way of alerting rescuers if the flight is overdue/missing, and they provide flight following that may warn of other nearby air traffic en route.

The process of producing a flight plan to describe a proposed aircraft flight is well known in the art. Typically, when a flight plan is produced, the pilot (1) calculates the amount of fuel required to complete the trip and (2) checks for compliance with air traffic control requirements, checks for clearance from terrain and structures near takeoff and landing areas, considers potentials for mid-air collisions, avoids restricted or prohibited areas of flight, and the like. In addition to these safety requirements, a pilot or individual making a flight plan may attempt to minimize overall flight costs by selecting the most efficient route, height, and speed for their particular aircraft type and sometimes seek to load the minimum necessary fuel, plus a safety reserve, on board, to maximize flight efficiencies. In flights having a longer duration, fixed base operators having disparate prices for aviation fuel are utilized at airports along the way.

In order to accomplish these goals, flight planning benefits from accurate and up-to-date information. For example, accurate weather forecasts are desired so that fuel consumption calculations can account for the fuel consumption effects of head or tail winds and air temperature. Furthermore, under the supervision of air traffic control, aircraft flying in controlled airspace may be required to follow predetermined routes known as airways, even if such routes are not as economical as a more direct flight. Within these airways, aircraft must maintain flight levels, specified altitudes usually separated vertically by 1000 or 2000 feet (305 or 610 m), depending on the route being flown, the altitude en route, and the direction of travel. Additionally, the performance of each different aircraft types varies based on altitude, air pressure, temperature and weight. When attempting to formulate an efficient flight plan, one quickly discovers that a large number of calculations would be required in order to formulate a flight plan that is even close to optimized. As a result, most flight plans follow one of several common routes at available altitudes which have the most favorable current or forecast weather conditions. However, sometimes these are not the most efficient routes under varying circumstances. The present invention solves a number of these inefficiencies as well as other problems present in the process of flight planning, as are illustrated in the descriptions that follow.

SUMMARY

Various technologies and techniques are disclosed for providing optimized flight planning services to a remote user. In one form, the user accesses a service through a series of web pages presented to the user. The user is able to specify an airport or area for arrival/departure for a future flight in a specified airplane type. The service then calculates an optimized route for the flight based upon aircraft performance data, available fuel costs, and up-to-date current or forecast aviation weather. In an alternate form, a flight route is formed from information within stored historical flight plans. By optimizing the path of a flight in this manner, many benefits can be realized.

In another embodiment, the service allows the user to arrange the purchase of aviation fuel at various locations. In a preferred form, the user is able to purchase the fuel at a discount provided by the service. In exchange, the service receives a fee from the affiliated fixed base operator for directing the transaction to them.

This summary is provided to introduce a selection of concepts in a simplified form that are described in further detail in the detailed description and drawings contained herein. This Summary is not intended to identify key features or essential features of the claimed subject matter, nor is it intended to be used as an aid in determining the scope of the claimed subject matter, as the claims appended thereto serve that function. Still further forms, embodiments, objects, advantages, benefits, features, and aspects of the present invention will become apparent from the detailed description and drawings contained herein.

BRIEF DESCRIPTION OF THE DRAWINGS

FIG. 3 is sample flight plan form as specified by the FAA and utilized by the present system and method.

DETAILED DESCRIPTION

Figure 1:
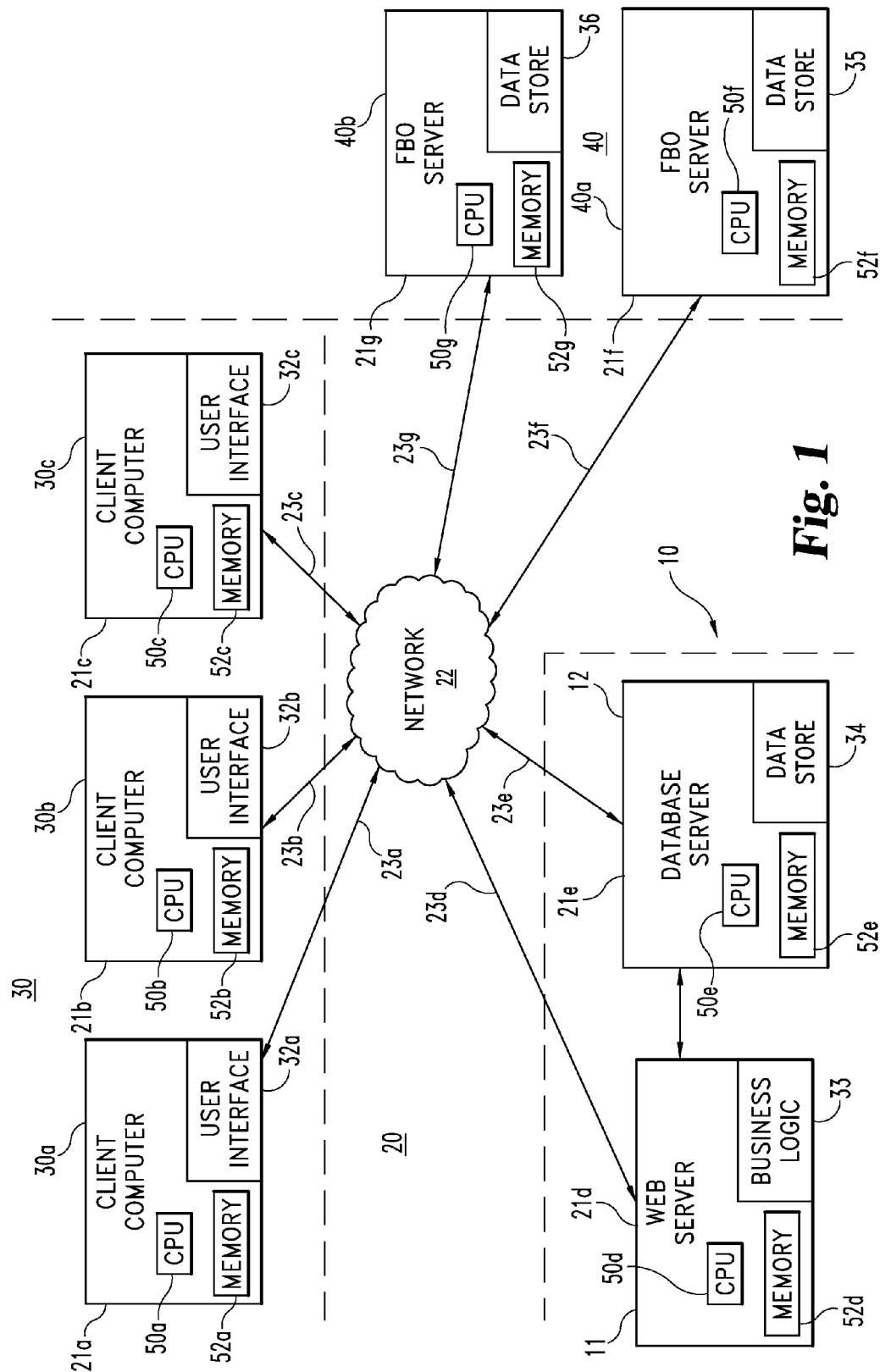
FIG. 1 is a diagrammatic view of a computer system of one implementation.

For the purposes of understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

On any given day, more than 87,000 flights take to the skies in the United States. Only 35 percent, or just over 30,000, of those flights are commercial carriers, such as Delta, United, or Southwest. The majority of the remaining flights, roughly 50,000, are general aviation flights (private planes), and air taxi flights (planes for hire), with the remaining being either military or cargo aircraft. While each of these is not required to submit a flight plan, a substantial portion of them do. In addition, the number of daily non-commercial flights is growing and will undoubtedly continue to rise as the need for air transportation increases.

Currently, flight planning is a relatively routine process. However, it is far from optimized and can be quite burdensome. Until applicants' invention, the exact flight plans of others have been difficult to obtain. In addition, a flight plan between two locations may be suitable on one day, but inefficient under the conditions of a subsequent day. Applicants have incorporated many of the features disclosed herein into a fully functioning website at flightaware.com/flightplan.

FIG. 1 is a diagrammatic view of a multi-site computer system 20 of one embodiment of the present invention. In the illustrative embodiment, computer system 20 includes aviation information service 10, two affiliated fixed base operator servers 40, and three client computers 30. In order to preserve clarity, only a small number of the many connected fixed base operator servers and client computers have been shown. Computer system 20 also includes computer network 22. Computer network 22 couples together a number of computers 21a-21g over network pathways 23a-23g, respectively. More specifically, system 20 includes several servers, namely Web Server 11 and Database Server 12 of aviation information service 10, and FBO (fixed base operators) Servers 40a and 40b, which are operated by affiliated fixed base operators at various geographic locations. System 20 also includes client computers 30a, 30b, and 30c (collectively 30). While computers 21a-21g are each illustrated as being a server or client, it should be understood that any of computers 21a-21g may be arranged to include both a client and a server. Furthermore, it should be understood that while seven computers 21a-21g are illustrated, more or fewer may be utilized in alternative embodiments. Preferably, service 10 includes a collection of Web servers 11 for receiving, processing, and responding to user queries.

Computers 21a-21g include one or more processors or CPUs (50a, 50b, 50c, 50d, 50e, 50f and 50g, respectively) and one or more types of memory (52a, 52b, 52c, 52d, 52e, 52f and 52g, respectively). Each memory 52 preferably includes a removable memory device. Each processor 50 may be comprised of one or more components configured as a single unit. When of a multi-component form, a processor 50 may have one or more components located remotely relative to the others. One or more components of each processor 50 may be of the electronic variety defining digital circuitry, analog circuitry, or both. Optical computing could be used as an alternative. In one embodiment, each processor 50 is of a conventional, integrated circuit microprocessor arrangement, such as one or more OPTERON processors supplied by ADVANCED MICRO DEVICES Corporation of One AMD Place, Sunnyvale, Calif. 94088, USA.

Each memory 52 (removable, fixed or both) is one form of a computer-readable device. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types, or other types not included in the above list. Also, each memory may be volatile, nonvolatile, or a hybrid combination of volatile and nonvolatile varieties.

Although not shown to preserve clarity, one or more of computers 21a-21g may be coupled to a display and/or may include an integrated display. Computers 21a-21g may be of the same type, or a heterogeneous combination of different computing devices. Likewise, displays may be of the same type, or a heterogeneous combination of different visual devices. Although again not shown to preserve clarity, each computer 21a-21g may also include one or more operator input devices such as a keyboard, mouse, track ball, light pen, and/or microtelecommunicator, to name just a few representative examples. Also, besides a display, one or more other output devices may be included such as a loudspeaker or printer. Various display and input device arrangements are possible.

Computer network 22 can be in the form of a wireless or wired Local Area Network (LAN), Municipal Area Network (MAN), Wide Area Network (WAN), such as the Internet, a combination of these, or such other network arrangement as would occur to those skilled in the art. The operating logic of system 20 can be embodied in signals transmitted over network 22, in programming instructions, dedicated hardware, or a combination of these. It should be understood that more or fewer computers like computers 21a-21g can be coupled together by computer network 22, and that Web Server 11 and Database Server 12 may also be connected to one another by a private LAN or similar private connection.

In one embodiment, system 20 operates at several various geographic locations. For example, aviation information service 10 may operate in one state, while FBO Servers 40a and 40b and client computers 30 may all be located in other unique states. Web Server 11 of service 10 is configured as a web server that hosts application business logic 33 for an aviation information engine, Database Server 12 is configured as a database server for storing aviation related information, including flight plans, within data store 34 and at least one of client computers 30 is configured for providing a user interface 32a-32c, respectively, for accessing the aviation information service 10. Preferably, Database Server 12 maintains at least 1 month of historical previously filed flight plans in data store 34, and most preferably maintains at least six months. In addition, Database Server 12 maintains FBO information, up-to-date aircraft performance information specified by various aircraft manufacturers, and aviation weather information within data store 34. In a further form, Database Server 12 maintains data store 34 as a memory-resident database to provide more advanced searching functionality and to minimize response times. User interface 32a-32c of client computers 30a-30c can be an installable application such as one that communicates with Web Server 11, can be browser-based, and/or can be embedded software, to name a few non-limiting examples.

In one embodiment, software installed locally on client computers 30a-30c is used to communicate with Web Server 11. In another embodiment, Web Server 11 provides HTML pages, data from web services, and/or other Internet standard or company proprietary data formats to one or more client computers 30a-30c when requested. One of ordinary skill in the art will recognize that the term web server is used generically for purposes of illustration and is not meant to imply that network 22 is required to be the Internet. As described previously, network 22 can be one of various types of networks as would occur to one of ordinary skill in the art. It shall be appreciated that data store 34 on Database Server 12 is suitably arranged to store data such as flight plans, fuel prices, historical weather information, and aircraft performance information to name a few representative examples.

In the illustrative embodiment, aviation fuel availability and pricing information is received from each FBO Server 40. This information may include the price of various types of aviation fuels such as, for purposes of non-limiting example, Jet A and 100LL. This information may be provided to Database Server 12 of service 10 periodically or may be sent through Web Server 11 in response to a request, as is described herein.

Typical applications of system 20 would include more client computers like computers 30a-30c at more physical locations, but only three have been illustrated in FIG. 1 to preserve clarity. Furthermore, although two servers 11 and 12 are shown, it will be appreciated by those of ordinary skill in the art that the one or more features provided by Web Server 11 and Database Server 12 could be provided by the same computer or varying other arrangements of computers at one or more physical locations and still be within the spirit of the invention. Farms of dedicated servers, a single proprietary system, and/or a Storage Area Network (SAN) could also be provided to support the specific features if desired. In the illustrative embodiment, in order to flexibly handle the large quantity of flight information received by service 10, Database Server 12 includes a relational database, such as SQL, as is known to one of skill in the art.

Figure 2:
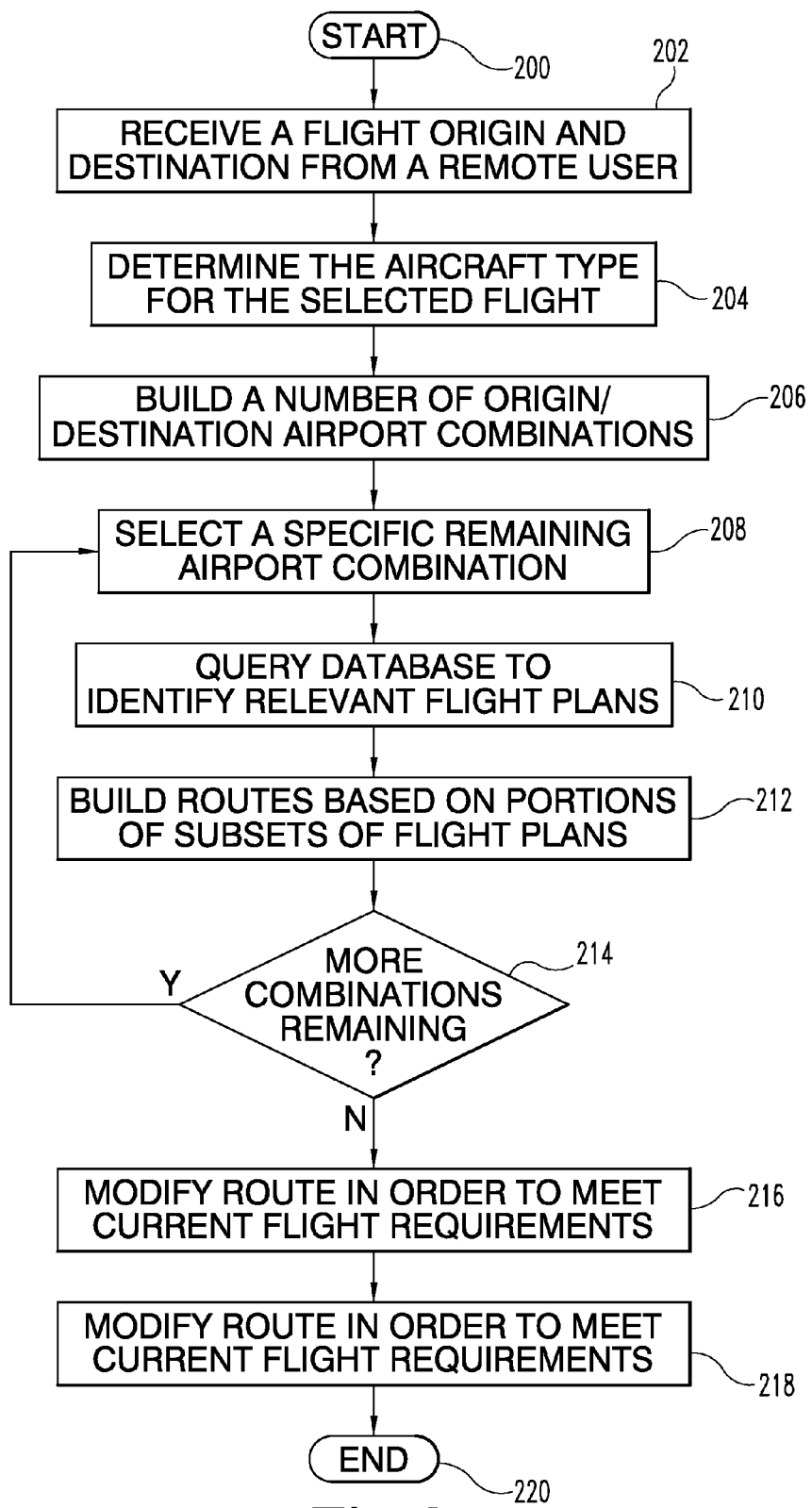
FIG. 2 is a flowchart illustrating the process for generating a flight plan based upon previous plans.

Turning to FIG. 2, with continued reference to FIG. 1, a flowchart illustrating the process for generating a flight route or flight plan based upon previous flight plans is illustrated. The process begins at start point 200 with the service 10 receiving an origin and destination from a remote user (step 202) connected to Web Server 11 via one of client computers 30. The origin and destination may individually be either an airport (specified by name/code) or a geographic area, depending upon the needs of the user. The origin and destination provided by the user is preferably processed by Database Server 12 using data within data store 34 to either confirm the existence of the airport codes or to generate a list of potential airport codes within the specified geographic area. In addition, the service 10 determines the aircraft type which the user plans to use in the current flight (step 204). The aircraft type may be input by the user as an aircraft class, model, specific tail number, and/or by other identifying information. In addition, the user may have a user account with service 10 which allows the service to automatically know the aircraft flown by the current user, as would be appreciated in the art, or to allow the user to easily select among several aircraft the user regularly flies. Any special equipment features of the aircraft can be noted, such as extended fuel tanks.

Once the user input is processed, service 10 builds a number of departure airport/destination airport combinations (step 206). In the event the origin and destination provided by the user are both specific airports, then only a single combination may be identified. In a preferred form, the service 10 utilizes nearby routes to/from nearby airports to identify routes which may be slightly modified to meet the user's desired flight. However, in most forms, when either one or both of the origin and destination includes a location having more than one available airport then a plurality of potential combinations are set for inclusion, except when only a single suitable airport exists within a specified location.

Given the departure/destination airport combinations, the service 10 preferably performs the following steps for each combination, unless instructed otherwise by the user. First, service 10 selects an available origin/destination airport combination for analysis (step 208) from the ones determined in step 206. For ease of reference, the origin destination airports of the currently selected combination will be referred to, within this section, as airport A and airport B, respectively. In a further form, the various combinations may include suggested airports, either presented to the user for approval or not, based upon availability indicated by weather information. In a still further form, the suggested alternate airports may be screened to ensure proper runway length, hours of operation, weight requirements, and the like for the selected aircraft type.

Once the set of combinations is complete, service 10 queries Database Server 12 to identify relevant flight plans (step 210) having a similar aircraft type to that of the current flight. In the preferred form, the query for previously filed plans is further limited to recently filed plans, such as within the last 12, 24, or 36 hours. In an alternate or further form, the query includes current or forecast aviation weather information (i.e. winds aloft, air temperature, icing, etc.) received by Web Server 11, such as from the National Oceanic and Atmospheric Administration (NOAA), so that only the previous flight plans most closely matching the weather which should be encountered by the current flight would be considered.

Web Server 11 then utilizes business logic 33 to build a set of routes from subsets of the identified flight plans, where each route is comprised of flight path information from at least a portion of one or more flight plans (step 212). For instance, one route may be comprised entirely of a flight path from airport A to airport B in a flight plan filed just hours earlier. Another route may be comprised of only a portion of a flight path which went from airport A to airport C, but stopped at airport B for refueling, with the A to B leg being used and the B to C leg being discarded. Additionally, still another route within the set may include a combination of two or more independent flight segments (i.e. "leg") which collectively begin at airport A and end at airport B. For example, a route may be a combination of a leg from a flight which refuels at airport A and destined for airport X and another leg from a different flight plan which begins at airport X and ends at airport B. With reference to flight plans herein, it should be understood that it may be the flight plans of others as filed are the source of data, but more preferably, preference may be given to data from the flight plans of others in the form approved by the FAA, or alternatively to data from flight plans that have been amended by en route changes from an actual flight taken. It can be further appreciated that a reference to flight plan data herein can also encompass historical data from an actual flight that has been completed, where data is available as to the actual duration of the flight and actual altitudes flown, and actual or forecast weather information for that time period, and the actual route taken and equipment type used.

Upon the completion of the set of routes from one combination in step 212, the service 10 determines whether more origin/destination airport combinations exist (step 214). In the event one does, the process returns to step 208. Otherwise, the process advances to step 216. It shall be appreciated that the various iterations of steps 208, 210, and 212 may occur in sequence as described herein, for purposes of clarity, or in parallel, such as would be possible in a multi-threaded computing environment.

Once all of the routes are built, as determined by step 214, they are modified in order to fit the departure time of the current user (step 216). This may include updating takeoff, waypoint, and arrival times, as well as many other factors that would be appreciated by one of skill in the art. Following step 216, the various updated flight routes are presented to the remote user (step 218). Preferably, the routes are presented by Web Server 11 to the remote user in the form of a web page, with the routes being sorted according to a set of criteria. The criteria may include, but is in no way limited to, total time, time in flight, distance, overall cost, fuel required, or some other best fit heuristic. The process ends at end point 220.

Figure 3:
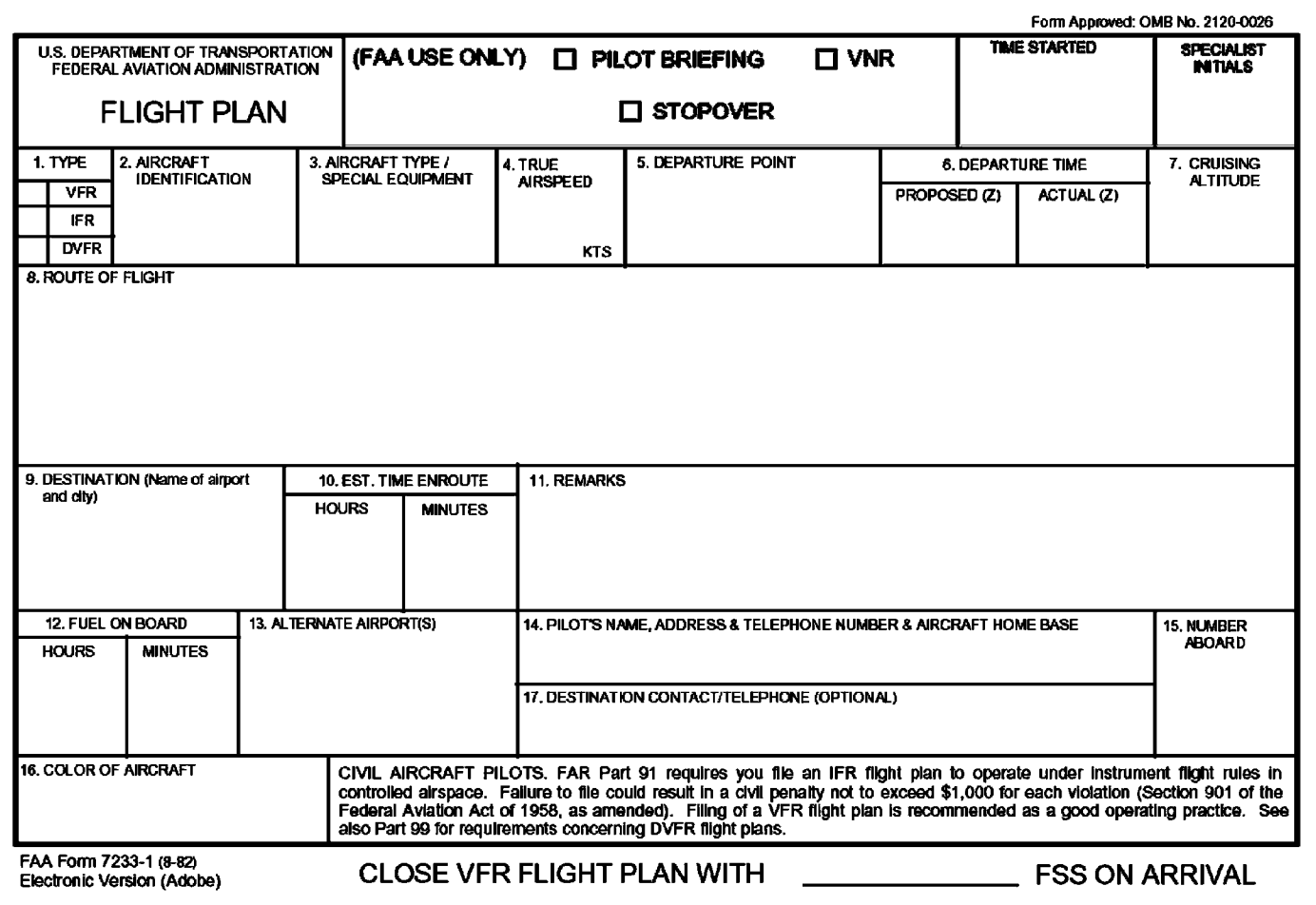

In a further form, Web Server 11 receives a selected route from the remote user (not shown) indicating their desired route. Web server 11 then accepts any final flight information required, such as the number of passenger aboard, and may optionally file the completed flight plan electronically (not shown) with the Federal Aviation Administration (FAA). For performing this function, the standard flight plan template provided by the FAA, as shown in FIG. 3, is completed. Additionally, for purposes of subsequent use, the currently filed flight plan is preferably stored by Database Server 12 for future use. Thereby, the accuracy of the flight routes taken by the flight plans stored in data store 34 increases over time as the recent flight plans evolve. Preferably, flight plan data is obtained directly from the FAA or air traffic control as it is received and/or approved and/or modified.

Figure 4:
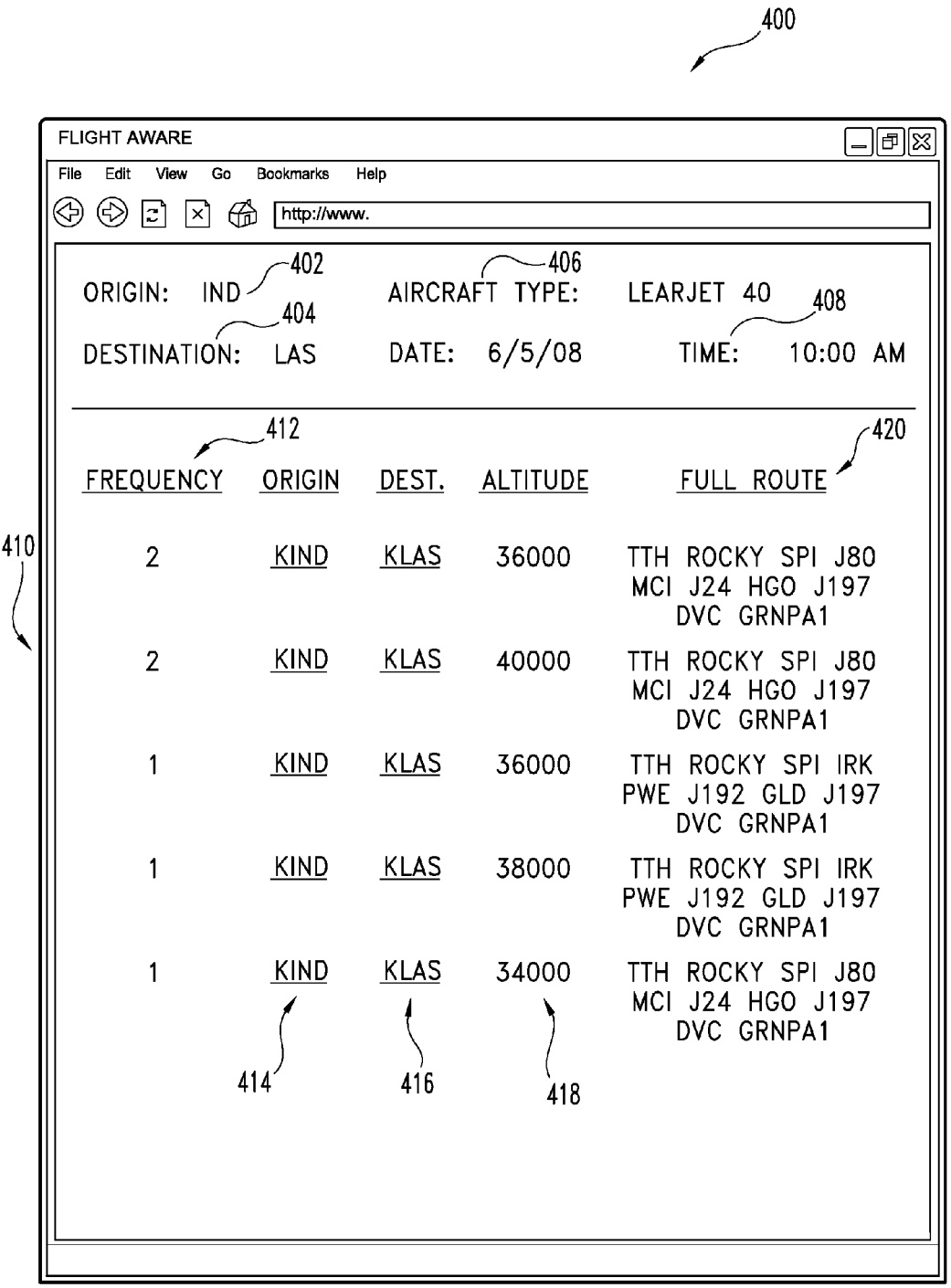
FIG. 4 is a diagrammatic view of a result displayed to a user in one form of the present system and method illustrated in FIG. 1.

Turning to FIG. 4 a representative web page presented by service 10 displaying available flight routes is illustrated. Specifically, FIG. 4 shows a representative web page 400 presented in response to a query concerning a specific origin airport 402, Indianapolis International (IND), and a specific destination airport 404, Mc Carran International (LAS), in this example. In addition, the aircraft type 406 and the departure date/time 408 which accompany the query are displayed. The result section 410 within web page 400 is divided into columns which provide information about the available routes. Column 412 indicates the frequency, or number of times, a route has been taken in the selected timeframe. Columns 414 and 416, respectively, indicate the origin and destination of each route. Column 418 indicates the primary altitude of the flight, while column 420 gives specifics of the full route. The route displayed may be in short form or in decoded form providing the latitude and longitude of each waypoint and an associated altitude and or climb rate. The remote user may select a route by clicking on it or otherwise and be presented with a subsequent web page allowing them to utilize the service to file a flight plan based upon the selected route, as described herein. Additional information on the referenced flight plans, such as the times they were schedule for, or the tail number of the flights, can also be displayed, if desired.

Figure 5:
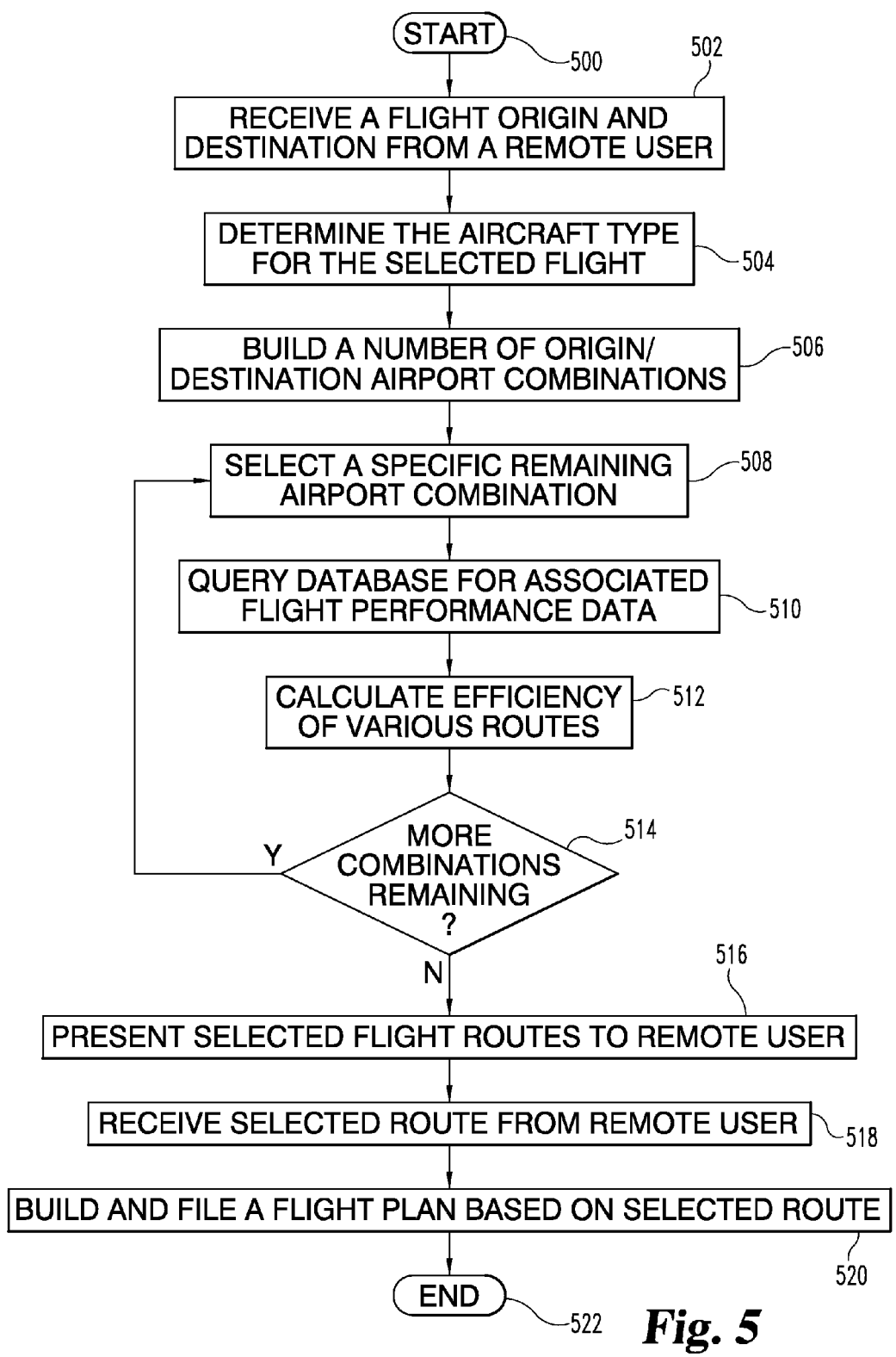
FIG. 5 is a flowchart illustrating the process for generating an optimized flight plan based upon aviation weather and aircraft performance information.

Turning to FIG. 5, with continued reference to FIG. 1, a flowchart illustrating a process for calculating an optimized flight plan based upon available aviation weather and aircraft performance information is illustrated. The process of FIG. 5 is comparable in large measure to much of that described as to FIG. 2. The process begins at start point 500 with the service 10 receiving a desired origin and destination from a remote user (step 502) connected to Web Server 11 via one of client computers 30. The service 10 also must determine the aircraft type which the user plans to use in the current flight (step 504), as described herein. Once the user input is complete, the service 10 builds a number of departure airport/destination airport combinations (step 506).

Given the departure/destination airport combinations, the service 10 preferably performs the following steps for each combination, unless instructed otherwise by the user. First, service 10 selects an available origin/destination airport combination for analysis (step 508) from those determined in step 506. The service 10 then queries Database Server 12 to identify the aircraft performance information associated with the aircraft type indicated by the remote user (step 510). In addition, the service 10 obtains up-to-date current and/or forecast aviation weather information (i.e. winds aloft, air temperature, icing, etc.). In the preferred form, this information is periodically received by Web Server 11, such as from the NOAA.

Web Server 11 then utilizes business logic 33 to perform mathematical calculations. Parameters that are preferably incorporated include planned altitude(s), fuel consumption, wind speed, temperature, and air pressure or density, known aircraft performance characteristics for the specific type being flown, and other factors including the need for and effect of anti-ice to calculate a total time and cost for each route (step 512). In a preferred form, each route also includes any necessary or beneficial refueling stops, and factors in the available cost for the correct type of aviation fuel, as is stored in data store 34 of Database Server 12. For instance, one route may include refueling at a selected FBO at the departure airport and making the flight entirely along a flight path using one altitude to the destination airport. Another route may include utilizing already available fuel (as specified by the user) to travel to an intermediate refueling destination at one altitude (for refueling by a different selected FBO) and then continue on to the destination airport at a different primary altitude. Additionally, various altitudes may be utilized within any single leg of the trip in order to gain efficiencies from the winds aloft or to avoid the impact of severe weather and/or conditions for icing.

Upon the completion of the set of routes from one combination in step 512, the service 10 determines whether more origin/destination airport combinations exist (step 514). In the event one does, the process returns to step 508. Otherwise, the process advances to step 516. It shall be appreciated that the various iterations of steps 508, 510, and 512 may occur in parallel or in sequence as described herein.

Once all of the routes are built, as determined by step 514, the various updated flight routes are presented to the remote user (step 516), in a similar fashion to that shown in FIG. 4. A column for total cost and flight duration may be selectively added. Preferably, the routes are presented by Web Server 11 to the remote user in the form of a web page, with the routes being sorted according to a set of criteria, such as total cost, time en route, or total number of stops. Once presented, the Web Server 11 receives a selected route from the remote user (step 518) indicating their desired route. Web Server 11 then accepts any final flight information, such as the number of passengers aboard, and may optionally file the completed flight plan electronically (step 520) with the Federal Aviation Administration (FAA) as described herein. The process ends at end point 522.

Figure 6:
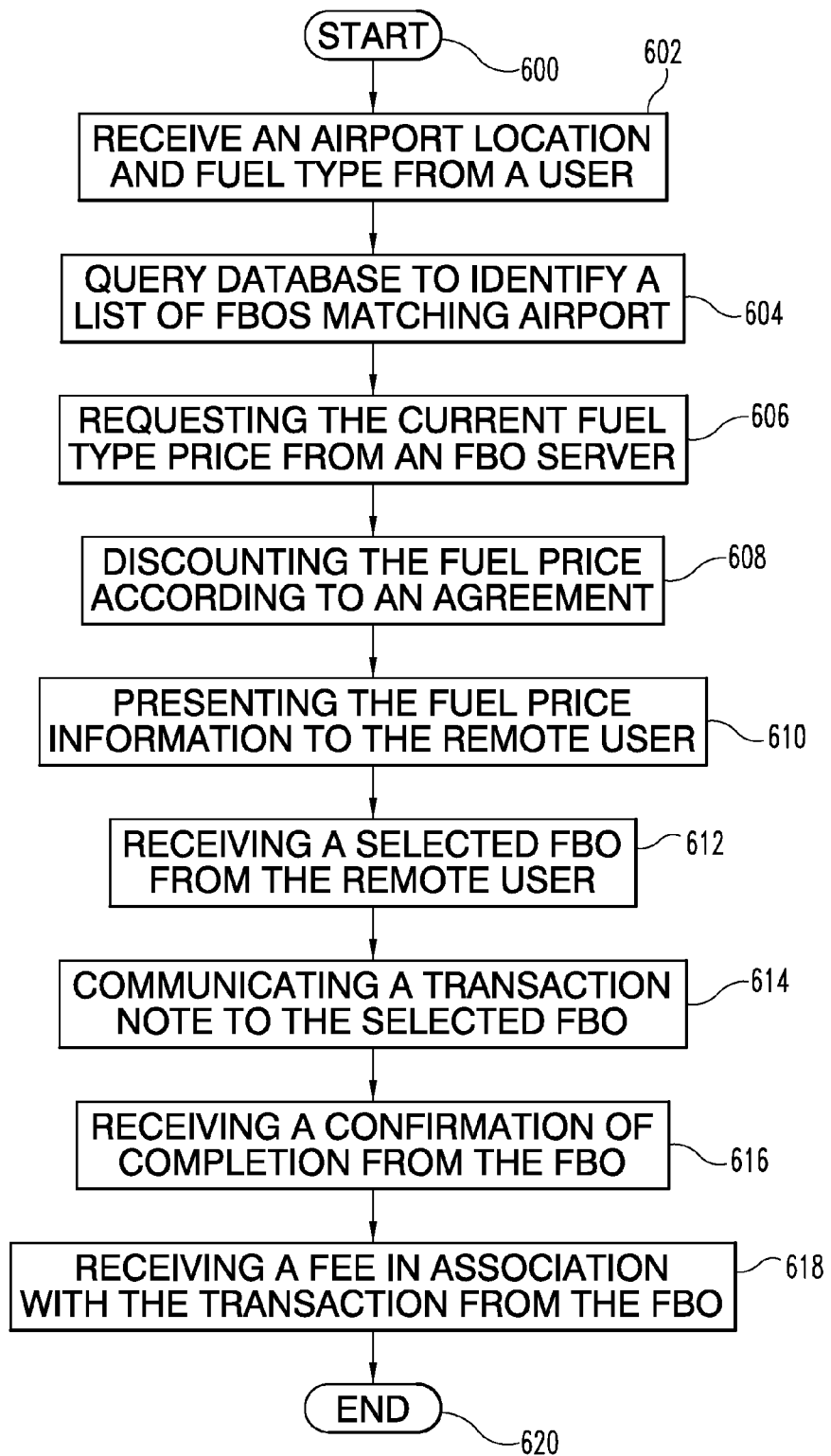
FIG. 6 is a flowchart illustrating the process for providing fuel transaction scheduling with affiliated FBOs during flight planning.

Referring now to FIG. 6, with continued reference to FIG. 1, a flowchart illustrating the process for providing fuel transaction scheduling with affiliated FBOs during flight planning is illustrated. The process begins at start point 600 with the user submitting an airport or location and fuel type to the aviation information service 10 using a web interface (step 602). In an alternate form, the aviation fuel type may be predetermined based upon the type of plane associated with the user or general user settings, as would be appreciate to one of skill in the art. It shall be appreciated that this information may be taken from a flight plan, such as those described herein, and that the steps of this process may be implemented within the steps of the process shown in FIG. 5 to obtain optimal discounted fuel prices.

Once the selected airport is received by service 10 at Web Server 11, a list of fixed base operators (FBOs) matching the airport location is retrieved from Data Store 34 by Database Server 12 (step 604). Using this list, Web Server 11 submits a query over network 22 to the respective FBO Server 40 associated with one or more of the FBOs in the list requesting the current price and availability of the specified fuel (step 606). Alternatively, FBO Servers may be configured to transmit any price changes to Web Server 11, such that current pricing information may be stored within data store 34 by Database Server 12 for subsequent retrieval and use.

In a preferred form, at least one fuel price is discounted over current market rates according to a prior agreement between the service 10 and the specific FBO (step 608). In one form, the discount comprises a fixed or graduated percentage or dollar amount based upon some criteria, such as the number of units purchased from the specific FBO, or a related association of FBOs, or the total volume purchased through the service in a specified period. Utilizing these prices, a total price and availability information for a requested amount of fuel at a variety of available FBOs is presented to the user (step 610.) The user then selects the FBO of their choice (step 612), such as by clicking on the FBO presented on a web page. Once selected, the user indicates their acceptance to the terms of the transaction (step 612), which preferably do not legally bind the user to complete the transaction. Upon acceptance, a note indicating the price and volume, amongst other necessary details of the scheduled transaction, is sent via Web Server 11 to the appropriate FBO Server 40 (step 614). With the transaction scheduled, the user is free to arrive at the FBO and complete the transaction.

Once the transaction is completed, the FBO Server 40 communicates notice to Web Server 11 by sending a confirmation (step 616), including the agreed upon price and the total sale amount. In exchange, the FBO associated with the FBO Server 40 remits a fee to the service 10 in accordance with their established agreement (step 618). The fee may be in various forms, including a flat or graduated fee, a set, stepped, or graduated percentage of the transaction, or any combination of these, or other alternatives. The fee may be based on other factors including the volume purchased from a specific FBO or common association of FBOs in a specified time period, or the like. The process ends at endpoint 620.

In an alternate form, the remote user may arrange payment with the service 10, and the service 10 may remit payment associated with each scheduled transaction to the FBO prior to dispensing the fuel or in response to notification of dispensing the fuel, with the service 10 keeping the portion of the payment from the user attributable to it, according to the terms of the agreement between the respective FBO providing the fuel and the service.

In a further preferred form, the service 10 offers to book rental cars, limousines, hotels, and the like based upon information presented during flight planning. In exchange, the service may also provide a discount for the user while receiving a fee for directing the business to a respective vendor.

In yet another further preferred form, the service 10 provides electronic Digital Terminal Procedures Publications (DTPP) charts for download having either the necessary charts prioritized or the unnecessary charts removed.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected.

Hence, the proper scope of the present invention should be determined from the appended claims so as to encompass all such modifications as well as all relationships equivalent to those illustrated in the drawings and described in the specification.

What is claimed is:

1. A method for flight plan optimization, said method comprising the steps of:
   maintaining a first electronic database of aircraft performance information and aviation weather including at least current temperatures and winds aloft;
   maintaining a second electronic database containing a plurality of fixed base operators, wherein each fixed based operator has an associated airport and a current price-per-unit for at least one type of aviation fuel;
   receiving over a network flight information from a remote user using a first server; wherein said flight information includes an origin and destination location, departure time, and an aircraft type;
   determining a fuel type required for said aircraft type using said first server;
   calculating a plurality of flight paths from said origin location to said destination location based upon accepted FAA guidelines, wherein each flight path comprises a plurality of flight segments having an altitude, climb rate, and air speed;
   calculating a total cost for each of said plurality of flight paths, wherein said total cost is calculated as the sum of the total cost of each flight segment, wherein the total cost of each flight segment is a function of the aircraft performance information associated in said first database with said aircraft type, said aviation weather, and said current price-per-unit for said fuel type associated in said second database with a selected set of fixed base operators; and
   transmitting at least a portion of said flight paths and their associated total cost to the remote user over said network.

2. The method of claim 1, wherein at least a pair of flight paths within said plurality follow the same route but have different altitudes for at least one point along said route.

3. The method of claim 1, wherein aviation icing information is stored in said first electronic database and any determined need for anti-ice is factored into said total cost.

* * * * *